United States Patent

[11] 3,588,573

| [72] | Inventors | Cheng-Lin Chen;<br>Robert J. Zollweg, Monroeville, Pa.;<br>Dietrich F. Ennulat, Elmira Heights, N.Y. |
|---|---|---|
| [21] | Appl. No. | 694,675 |
| [22] | Filed | Dec. 29, 1967 |
| [45] | Patented | June 28, 1971 |
| [73] | Assignee | Westinghouse Electric Corporation<br>Pittsburgh, Pa. |

[54] ALUMINA-RARE EARTH OXIDE CERAMIC TO METAL SEALS FOR CONTAINING HIGH TEMPERATURE VAPORS
6 Claims, 3 Drawing Figs.

[52] U.S. Cl. ..................... 313/221,
106/39, 106/47, 313/220
[51] Int. Cl. ..................... H01j 61/00,
H01j 61/36
[50] Field of Search ..................... 106/39, 47;
313/220, 221

[56] References Cited
UNITED STATES PATENTS

| 3,281,309 | 10/1966 | Ross | 106/39X |
| 3,363,134 | 1/1968 | Johnson | 313/220 |
| 3,385,463 | 5/1968 | Lange | 313/220X |
| 3,469,729 | 9/1969 | Grekila et al. | 106/47X |

OTHER REFERENCES

Schneider, S. J., Roth, R. S., and Waring, J. L.; SOLID STATE REACTIONS INVOLVING OXIDES OF TRIVALENT CATIONS, in JOURN. RES. NATL. BUR. STDS., 65A, July-August 1961 pp. 345, 364—365 QC1J511

*Primary Examiner*—Helen M. McCarthy
*Assistant Examiner*—W. R. Satterfield
*Attorneys*—A. T. Stratton, W. D. Palmer and B. R. Studebaker ABSTRACT: A family of sealing compositions for sealing refractory metal end closure members to tubular polycrystalline alumina envelopes. The sealing compositions comprise a mixture of aluminum oxide and one or more rare-earth oxides selected from the group consisting of yttrium oxide, neodymium oxide, samarium oxide, gadolinium oxide, europium oxide, dysprosium oxide, praseodymium oxide, terbium oxide, holmium oxide, erbium oxide, thulium oxide, ytterbium oxide, and lutetium oxide in nearly eutectic proportions.

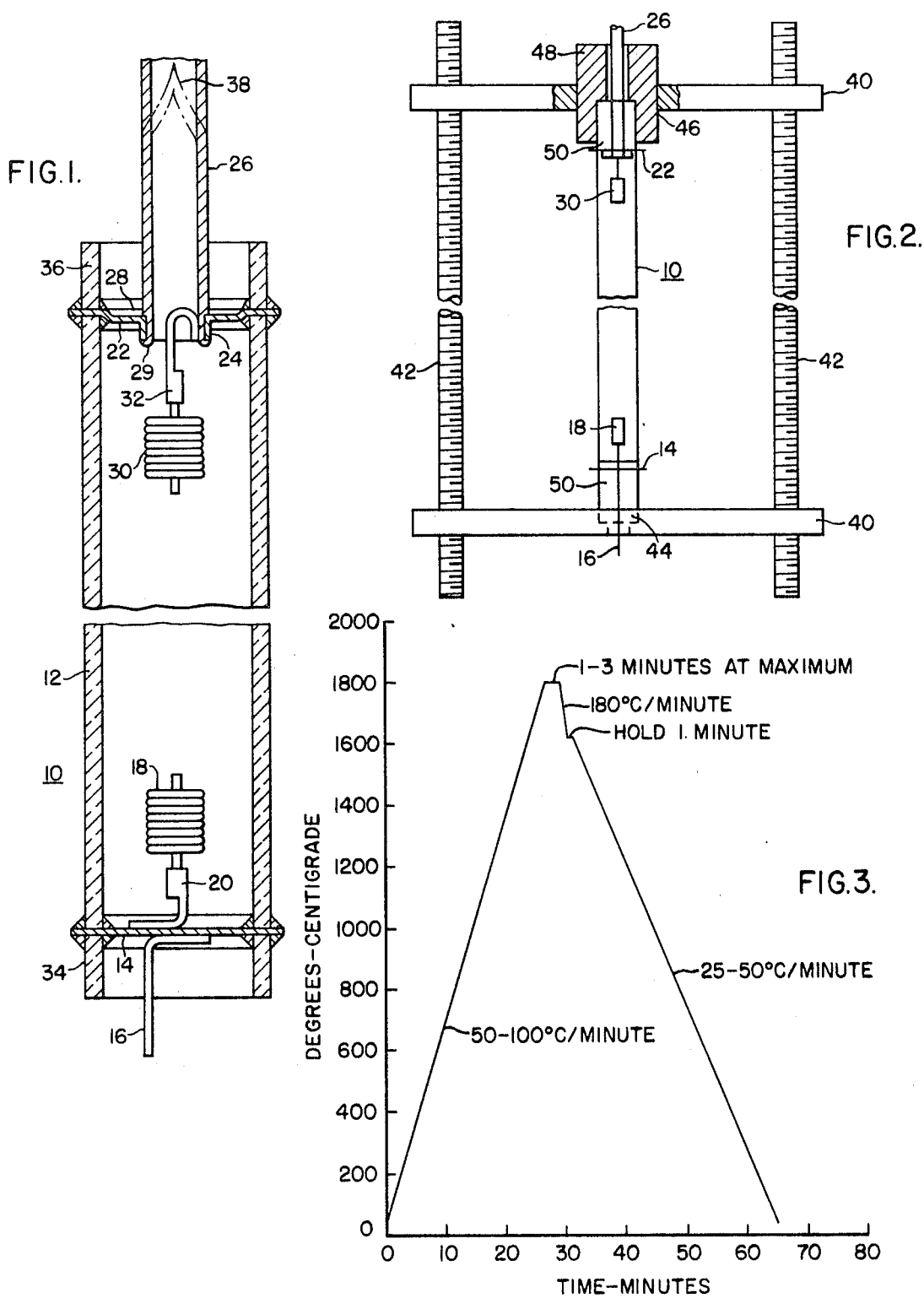

ALUMINA-RARE EARTH OXIDE CERAMIC TO METAL SEALS FOR CONTAINING HIGH TEMPERATURE VAPORS

BACKGROUND OF THE INVENTION

The high mechanical strength and excellent insulating properties, both electrical and thermal, of ceramics at elevated temperatures has caused ceramic materials to play increasingly important roles in the manufacture of high power vacuum tubes, high power lamps as well as many other electrical devices and structural elements. The particular problem in the use of ceramic materials in high temperature applications is the bonding of the ceramic to metals, particularly refractory metals, to provide a vacuum-tight seal. Numerous compositions have been employed in an effort to seal these ceramic bodies, particularly ceramic bodies of high alumina content to other ceramic or refractory metal members. The bonding problem has been more or less solved in situations wherein the application of the seal will not be subjected to temperatures in excess of 1,000° centigrade. For example, where the metal to ceramic joint will be exposed to temperatures of less than 400° centigrade during use and where alkali metal vapor atmospheres are not present a two step molybdenum-manganese metallizing process is available. In this process the ceramic is metallized with the molybdenum-manganese powder followed by an appropriate coating of nickel or copper and the subsequent brazing of the metal member to the nickel or copper with a suitable brazing alloy.

In many applications significantly higher temperatures are encountered and this is particularly true in the case of arc lamps employing high purity alumina envelopes wherein, for example, substantially pure high density polycrystalline alumina or sapphire is bonded to refractory metals such as niobium, tantalum, or molybdenum and wherein temperatures in excess of 1500° C. as well as alkali metal vapor atmospheres are often present. In many instances, for example, where the discharge sustaining filling in the arc lamp comprises mercury or some metal halides, the present methods of sealing high density alumina to refractory metals in arc lamps with sealing compositions comprising aluminum oxide, calcium oxide, and silicon dioxide or aluminum oxide, calcium oxide and magnesium oxide have been quite successful. However, many metallic halides such as scandium iodide, yttrium iodide and titanium iodide, which show promise as components for future arc lamps because of their estimated high luminous efficiencies and the good color, can be shown by thermodynamic calculations and in some cases by experiment not to be compatible with the above-described sealing compositions. To decide whether a lamp body or a sealing composition is adequate for the manufacture of the arc lamps a thermodynamic calculation of possible chemical reactions can be performed. For example to see whether a lamp containing cerium iodide is compatible with a seal containing calcium oxide the free energy change for the reaction is determined as follows:

$$2CeI_3(g) + 3CaO(c) \rightarrow Ce_2O_3(c) + 3CaI_2(g)$$

This simple calculation shows that the free energy change, $\Delta F$, at 1500° K., for this reaction is −41 kcal. Indicating that the reaction will proceed to the right. Therefore, instead of having the $CeI_3$ vapor which has a relatively high luminous efficiency we would obtain calcium iodide vapor with much lower luminous efficiency. This calculation of free energy change may be utilized to compare many potential oxide sealing materials with respect to the particular metal iodide vapors intended for use in the lamp. Positive $\Delta F$ values indicate freedom from reaction with iodine or iodides and usually the seal or envelope should have a more positive $\Delta F$ than the metal iodide lamp vapor. For example a cerium iodide vapor will probably react with a seal of calcium oxide and aluminum oxide but could be safely contained by a seal consisting of yttrium oxide and aluminum oxide. Calculations of this nature provide a conclusion that the majority of the alkaline earths are rather susceptible to reactions with metal iodides.

SUMMARY OF THE INVENTION

It is an object of the present invention to provide a sealing composition for sealing refractory metal or ceramic end closure members to high density polycrystalline alumina envelopes.

Another object of the present invention is to provide a sealing composition for sealing refractory metal and ceramic end closure members to ceramic envelopes which will provide a good bond, withstand high temperatures and attack from alkali metal vapors and/or metal halide vapor.

A still further object of the present invention is to provide a sealing composition for sealing refractory metal or ceramic end closure members to tubular polycrystalline alumina envelopes employed as arc tubes in high temperature arc discharge lamps, which sealing composition, will provide a good bond, withstand high temperatures and be resistant to attack from the alkali metal vapors and/or metal halide vapors employed in the discharge sustaining filling.

The foregoing objects are accomplished in accordance with the present invention by employing in a ceramic bodied arc lamp, a sealing composition for sealing the electrode carrying end closure members to that envelope, which sealing composition comprises a mixture of aluminum oxide and one or more rare earth oxides selected from the group consisting of yttrium oxide, neodymium oxide, samarium oxide, gadolinium oxide, europium oxide, dysprosium oxide, praseodymium oxide, terbium oxide, holmium oxide, erbium oxide, thulium oxide, ytterbium oxide, and lutetium oxide in nearly eutectic proportions.

BRIEF DESCRIPTION OF THE DRAWING

The foregoing objects along with many of the attendant advantages of the present invention will become more readily apparent and better understood as the following detailed description is considered in connection with the accompanying drawing in which:

FIG. 1 is a sectional view of a high temperature metal vapor discharge lamp illustrative of one possible use of the sealing compositions of the present invention;

FIG. 2 illustrates a fixture for use in sealing ceramic body members to metal or ceramic end closure members in a vacuum furnace; and FIG. 3 is a firing schedule diagram illustrative of one method of producing ceramic to metal seals in accordance with the present invention.

DESCRIPTION OF THE PREFERRED EMBODIMENT

One of the principal uses for which the sealing compositions of the present invention have been highly successful is in the sealing of the end discs or caps to high temperature metal vapor discharge tubes of the type illustrated in FIG. 1. The discharge tube generally designated 10 includes a ceramic envelope or tube 12 which is preferably constructed of high density polycrystalline alumina having an alumina content in excess of 99.5 percent $Al_2O_3$. One end of the discs of the envelope is closed off by a refractory metal, disc shape, end closure member 14 of for example niobium, tantalum, or molybdenum. A lead in conductor 16 is spot welded to the exterior surface of the disc 14 and a mounting strap 20 which supports a coiled tungsten electrode 18 is spot welded to the interior surface of disc 14. The other end of the lamp envelope or body 12 is closed off by a second disclike closure member 22 which has located centrally therein an opening which is defined by a cylindrical flange 24. Flange 24 may be formed in the niobium, tantalum or molybdenum disc by piercing the disc in the center and drawing out the central portion of the disc to form the cylindrical shape. The interior diameter of the flange 24 is such that it will receive in a close fitting relationship, a piece of exhaust tubulation 26. The refractory metal tubulation 26 may be secured, vacuum tight, to the flange 24 and disc 22 by means of an arc weld 29. A second tungsten electrode 30 is carried by a refractory metal strap 32 and at its other end the strap may be secured directly to the disc 22 alternatively, as shown in FIG. 1, the strap can be placed on the interior surface of the tubulation 26 and arc welded thereto.

The sealing compositions of the present invention may be employed to secure the end discs 14 and 22 to the ceramic body 12 and backup rings 34 and 36 may be also sealed to the refractory metal discs by the sealing compositions of this invention. The ceramic backup rings 34 and 36 are generally of the same cross-sectional configuration as the tube or body member 12 and are employed to balance any strains set up between the closure member and the alumina parts due to the temperatures encountered by the lamp ends during operation. The refractory metal tubulation is necessary in the lamp construction to provide access to the interior of the lamp body for evacuation and filling thereof. After completion of the evacuation and filling of the lamp, tubulation 26 is customarily pinch sealed as shown in dotted lines at 38. Of course the sealing compositions of the present invention may be employed to seal end discs and end caps of substantially different configurations than those illustrated in FIG. 1 to the ceramic body member of an arc discharge lamp and the embodiment of FIG. 1 is merely illustrative of one form of a ceramic discharge lamp.

Additionally the sealing compositions disclosed herein have utility in applications other than the construction of discharge lamps. In any situation where it is desired to seal a ceramic closure member or a refractory metal closure member to a ceramic container and wherein further it is desirable to have a vacuum-tight seal and a seal which is resistant to high temperatures and attack by alkali metal vapors and/or metal halide vapors, the sealing compositions of the present invention are particularly suitable.

The sealing composition of the present invention comprises a mixture of $Al_2O_3$ and one or more rare-earth oxides selected from the group consisting of $Y_2O_3$, $Nd_2O_3$, $Sm_2O_3$, $Gd_2O_3$, $Eu_2O_3$, $Dy_2O_3$, $Pr_2O_3$, $Tr_2O_3$, $Tb_2O_3$, $Ho_2O_3$, $Er_2O_3$, $Tm_2O_3$, $Yb_2O_3$ and $Lu_2O_3$ in nearly eutectic proportions.

It is desirable that the constituents of the sealing composition be mixed in as nearly eutectic proportions as possible. Since phase diagrams are not available for all of the rare earth oxide-alumina systems the eutectic has been estimated as closely as possible and each appears to fall in a range of between 75 to 82 mole percent $Al_2O_3$ and 18—25 mole percent of the rare-earth oxide. The following chart indicates the various percentages employed for each alumina rare-earth oxide composition and the approximate maximum firing temperature for each of these eutectic compositions all of which have been successfully employed to seal alumina envelopes to refractory metal closure members.

TABLE I

BINARY EUTECTICS FOR VACUUM TIGHT CERAMIC-METAL SEALS

| Eutectic composition $Al_2O_3+$ | Mole percent $Al_2O_3$ | maximum firing temperature, °C. |
| --- | --- | --- |
| $Y_2O_3$ | 80 | 1,850 |
| $Nd_2O_3$ | 77 | 1,755 |
| $Sm_2O_3$ | 77 | 1,775 |
| $Gd_2O_3$ | 77 | 1,750 |
| $Eu_2O_3$ | 77 | 1,720 |
| $Dy_2O_3$ | 80 | 1,740 |
| $Pr_2O_3$ | 77 | 1,740 |
| $Tb_2O_3$ | 77 | 1,745 |
| $Ho_2O_3$ | 80 | 1,770 |
| $Er_2O_3$ | 80 | 1,860 |
| $Tm_2O_3$ | 80 | 1,740 |
| $Yb_2O_3$ | 80 | 1,830 |
| $Lu_2O_3$ | 80 | 1,860 |

A deviation of from about 3 to 5 mole percent from the eutectic composition of each of the above-listed systems have been found not to affect the good bonding and vacuum tight characteristics of these seals. However, deviations above 5 percent may raise the sealing temperature causing one of the components to precipitate out thus providing a nonuniform coarse-grained seal which will be weaker than the preferred seals.

Ternary systems are also within the concept of the present invention and successful seals have been made employing alumina oxide, yttrium oxide and neodymium oxide with only a minor depression of about 20 to 50° C. in the melting point with no loss to the good bonding or vacuum characteristics of the seal.

The sealing compositions of the present invention are prepared by mechanically mixing the oxide powders. The mixed compound is then suspended in a vehicle of amyl acetate and, where desired, a small amount of "Dupont Duco Cement" may also be employed as a binder. Preparation of a frit from a prefered eutectic composition may result in a more uniform material and hence be desirable but it has been found that this is not necessary to make satisfactory seals. A single layer of the suspended sealing composition is applied to the mating surfaces of the polycrystalline alumina cylinder and the metal end closure members and allowed to dry. The lamp is then assembled in the fixture and additional sealing material applied as a filler along the joint. The sealing compositions of the present invention are prepared and fired in a manner similar to that disclosed in detail in copending application Ser. No. 562,016 for Sealing Composition filed June 30, 1966 by R.B. Grekila et al. and owned by the assignee of this invention.

A typical fixture for supporting the lamp during firing is shown in FIG. 2. It consists of two ¼-inch thick by 4-inch diameter molybdenum plates 40 separated by three threaded molybdenum rods 42. The lower plate has counterbored receptacles 44 for 12 arc lamps 10 with corresponding clearance holes 46 in the upper plate to align individual molybdenum weights 48 for each lamp. The lamps are separated from the molybdenum plate and weights by ½-inch sections of polycrystalline alumina tubing 50 which may or may not be backup rings 34 and 36 of FIG. 1 depending on the construction and form of the end closure members 14 and 22.

Tantalum, niobium or molybdenum parts for the lamp are first fabricated and degreased in trichloroethylene and acid cleaned for 5 minutes in 60 percent $HNO_3$ plus 15 percent HF. They are then rinsed with distilled water and dried with reagent alcohol or freon. The tungsten electrodes are then spot welded to the end closure members with emissive material if desired. The PCA cylinders are cleaned in boiling 60 percent $HNO_3$ for 5 to 10 minutes followed by rinsing in distilled water and drying with alcohol.

The fixture and lamps are then loaded into the vacuum furnace and evacuated. After an adequate vacuum of about $5\times10^1$Torr is achieved the lamps are fired according to the schedule illustrated in FIG. 3. The oven temperature is raised at a rate of about 50 to 100° C. per minute to a maximum temperature for the particular composition. This temperature is held for 1 minute and the oven power then turned completely off to cool quickly at a rate of about 180° C. per minute for 1 minute. This temperature is then held for 1 minute to permit annealing and then the furnace is allowed to cool at a rate of about 25 to 50° C. per minute.

For one specific example of a seal constructed in accordance with the present invention, a sealing composition containing about 65 weight percent $Al_2O_3$ plus 35 weight percent $Y_2O_3$ was employed in making vacuum tight butt seals between ⅜ inch outside diameter "LUCALOX" tubing and 0.010 inch thick niobium end discs such a lamp containing sodium and mercury vapor operated at 300 watts for in excess of 190 hours. Photomicrographs of seals constructed in this manner have shown a desirable dense fine grain structure.

As another example a mixture containing 54.9 weight percent $Al_2O_3$ and 45.1 weight percent $Nd_2O_3$ is employed to make a similar seal and produced strong vacuum tight butt seals with an approximate maximum firing temperature of between 1730 and 1785° C. Each of the eutectic sealing compositions of Table I have produced vacuum-tight, high-strength bonds between alumina ceramic envelopes and refractory metal closure members. It is preferable with seals of this type that the sealing temperature or maximum temperature illustrated in FIG. 3 be within 10 to 20 C. of optimum to obtain the best quality seals. On the basis of compatibility with desired arc lamp fill vapors such as rare-earth iodides, seals of $Sm_2O_3$, $Y_2O_3$ and $Nd_2O_3$ would seem to be preferred on the basis of available thermodynamic data. Whether a particular sealing composition would be adequate for a particular fill would have to be determined on an individual basis because of known differences among the rare-earths. For commercial applications such additional factors as cost of the sealing material and even sealing temperature may be decisive factors.

As will be apparent from the foregoing, sealing compositions for sealing ceramic or refractory metal closure members to tubular polycrystalline alumina envelopes which comprise a mixture of aluminum oxide and one or more rare-earth oxides selected from the group consisting of yttrium oxide, neodymium oxide, samarium oxide, gadolinium oxide, europium oxide, dysprosium oxide, praseodymium oxide, terbium oxide, holmium oxide, erbium oxide, thulium oxide and ytterbium oxide and lutetium oxide in nearly eutectic proportions or more specifically in mole percent proportions of between 75 and 82 mole percent $Al_2O_3$ and 18 and 25 mole percent rare-earth oxide provide a good vacuum tight bond which is more resistant to attack by high temperature metal halide and/or alkali metal vapor atmospheres than prior art seals.

Obviously numerous changes may be made in the above-described embodiments of the invention and different embodiments of the invention may be made without departing from the spirit thereof, it is intended that all matter contained in the foregoing description or shown in the accompanying drawings, shall be interpreted as illustrative and not in a limiting sense.

We claim:

1. A sealing composition consisting essentially of a mixture of $Al_2O_3$ and one or more rare earth oxide selected from the group consisting of $Y_2O_3$, $Nd_2O_3$, $Sm_2O_3$, $Gd_2O_3$, $Eu_2O_3$, $Dy_2O_3$, $Pr_2O_3$, $Tb_2O_3$, $Ho_2O_3$, $Er_2O_3$, $Tm_2O_3$, $Yb_2O_3$ and $Lu_2O_3$ in proportions not deviating from the eutectic composition by more than 5 mole percent.

2. A sealing composition according to claim 1 wherein said $Al_2O_3$ is present in an amount of from about 75 to 82 mole percent and said one or more rare-earth oxide is present in an amount of from about 18 to 25 mole percent.

3. A sealing composition for sealing alumina, tantalum, niobium or molybdenum end closure members to an alumina envelope, said sealing composition consisting essentially of a mixture of $Al_2O_3$ and one or more rare-earth oxide in proportions not deviating from the eutectic by more than 5 mole percent.

4. A sealing composition according to claim 3 wherein said $Al_2O_3$ is present in an amount of from about 18 to 25 mole percent and said one or more rare-earth oxide is present in an amount of from about 18 to 25 mole percent.

5. A sealing composition for sealing alumina, tantalum, niobium, or molybdenum end closure members to an alumina envelope; said sealing composition consisting essentially of a mixture of $Al_2O_3$ and one or more rare-earth oxide selected from the group consisting of $Y_2O_3$, $Nd_2O_3$, $Sm_2O_3$, $Gd_2O_3$, $Eu_2O_3$, $Dy_2O_3$, $Pr_2O_3$, $Tb_2O_3$, $Ho_2O_3$, $Er_2O_3$, $Tm_2O_3$, $Yb_2O_3$ and $Lu_2O_3$ in proportions not deviating from the eutectic for such composition by more than 5 mole percent.

6. A sealed discharge device comprising:
a hollow elongated ceramic envelope principally comprising alumina, a refractory metal or ceramic closure member selected from the group comprising niobium, tantalum, molybdenum and alumina positioned approximate each end of said ceramic envelope, an electrode within said envelope adjacent each closure member and electrically connected therethrough, and a sealing composition hermetically bonding said closure members to said ceramic envelope, said sealing composition consisting essentially of a mixture of $Al_2O_3$ and one or more rare earth oxide in proportions not deviating from eutectic proportions by more than 5 mole percent.